United States Patent [19]

Lankheet

[11] 3,754,977

[45] Aug. 28, 1973

[54] METHOD OF SPRAYING GLASS FIBER AND RESINS ONTO SUBSTRATE WHICH ELIMINATES NECESSITY OF ROLLING

[75] Inventor: Jay A. Lankheet, Holland, Mich.

[73] Assignee: Glamour Pools by Aztec, Wyckoff, N.J.

[22] Filed: Oct. 16, 1970

[21] Appl. No.: 81,573

[52] U.S. Cl....... 117/105.5, 117/95, 117/138.8 UA, 117/148
[51] Int. Cl......... B44d 1/08, B44d 1/26, B44d 1/22
[58] Field of Search .................... 117/161, 105.5 B, 117/100.5, 126 GB

[56] References Cited

UNITED STATES PATENTS

| | | | |
|---|---|---|---|
| 2,804,438 | 8/1957 | Biefeld et al. | 117/161 X |
| 2,819,243 | 1/1958 | Baker | 117/161 X |
| 2,850,421 | 9/1958 | Thompson | 117/161 X |
| 2,871,420 | 1/1959 | Minter et al. | 117/161 X |
| 2,899,402 | 8/1958 | Squire | 117/161 X |
| 3,009,824 | 11/1961 | Boynton et al. | 117/161 X |
| 3,230,184 | 1/1966 | Alford | 117/161 X |
| 3,336,179 | 8/1967 | Campbell et al. | 117/161 X |
| 3,340,220 | 9/1967 | Granito et al. | 117/161 X |
| 3,414,424 | 12/1968 | Peeps et al. | 117/161 X |
| 3,582,388 | 6/1971 | Stayner | 117/161 X |
| 3,539,441 | 11/1970 | Rabenold | 117/126 |
| 3,107,057 | 10/1963 | Hanusch | 117/105.5 |
| 3,061,496 | 10/1962 | Meyer | 117/126 X |
| 3,146,499 | 9/1964 | Keppler et al. | 117/161 X |
| 3,158,519 | 11/1964 | Shannon et al. | 117/126 X |
| 3,338,848 | 8/1967 | Hamilton | 117/161 X |
| 3,488,305 | 1/1970 | Siconolfi et al. | 117/126 X |

FOREIGN PATENTS OR APPLICATIONS

| | | | |
|---|---|---|---|
| 587,033 | 11/1959 | Canada | 117/126 |
| 216,920 | 3/1957 | Australia | 117/126 |

*Primary Examiner*—William D. Martin
*Assistant Examiner*—William H. Schmidt
*Attorney*—Price, Heneveld, Huizenga & Cooper

[57] ABSTRACT

An inert, non-absorbent dust is mixed with polyester resin in sufficient quantities that when the mixture is sprayed with fiber glass particles to form a rigid layer of reinforced plastic, the fiber glass particles lay flat without need of rolling.

9 Claims, No Drawings

METHOD OF SPRAYING GLASS FIBER AND RESINS ONTO SUBSTRATE WHICH ELIMINATES NECESSITY OF ROLLING

BACKGROUND OF THE INVENTION

This invention relates to fiber glass reinforced panels. It can be used for applying a rigidifying backing layer to the back of a facing sheet of acrylic plastic which has been molded to provide a panel having a decorative appearance. Similarly, it can be used to provide plywood with a plastic surface. Yet another example of its use is in spraying a bottom or sides for a pool or the like.

In the prior art, a polyester resin, including appropriate fillers, is mixed with fiber glass particles and applied to the back of a plastic sheet to provide a reinforcing layer for the plastic sheet. The polyester resin is delivered to a spray gun which sprays it onto the back of the plastic sheet. The fiber glass which is mixed with the resin comes in cord or strand form on large rolls, and the strand is also fed to the spray gun where it is chopped into small particles by means of a chopper wheel positioned at the spray head. The chopper wheel is rotated by a motor and includes a plurality of razor blades which chop the fiber glass cord into smaller particles. Finally, a catalyst for initiating curing of the polyester resin is delivered to the spray gun and is mixed with the polyester resin at the spray head. As the polyester resin mix is sprayed past the chopper, it picks up the fiber glass particles and carries them to the backing sheet.

Unfortunately, as the fiber glass particles and resin hit the plastic sheet, the fiber glass particles do not lay down properly. While the reason for this is not entirely understood, it appears that the resin foams as it hits the plastic sheet and causes the fiber glass particles to stand up rather than lay down flat. Accordingly, once a layer of fiber glass particles and resin is applied to the plastic sheet, it must be rolled flat. To further complicate matters, the rollers used require continual cleaning, and accordingly, it has not been possible to automate this operation. Thus, a costly and time consuming hand rolling operation must be used in connection with this spraying technique.

Further, in most circumstances this rolling step must be resorted to twice, since the resin and fiber glass mixture must be applied in two separate thin layers, rather than one layer having the finally desired thickness. This is due to shrinkage which is inherent in such resin and fiber glass systems. If one thick layer were applied, the shrinkage of resin would be so great that the decorative plastic panel being rigidified would warp. By applying the resin and fiber glass in two separate, thin layers, the shrinkage created in each application is minimized and the chances of warpage of the plastic sheet are thereby minimized.

Another problem encountered in the prior art is that the resin curing reaction occasionally causes the plastic sheet to melt through, thereby creating totally unacceptable holes in the plastic sheet. This may be due either to the heat of polymerization or it may be due to a direct chemical reaction between the polyester resin and the acrylic plastic sheet.

Finally, because the fibrous particles will not lay down without rolling, it is not economical to use this method for anything other than reinforcing panels. It would not be feasible, for example, to use this method to spray a pool bottom.

SUMMARY OF THE INVENTION

In the present invention, the fibrous glass particles lay down without rolling when sprayed with the polyester resin. The polyester resin is first mixed with an inert, non-absorbent dust, and this mixture is then delivered to the spray gun. The particle size of the dust is sufficiently small that the dust will remain in suspension in the resin at least for a time sufficient to facilitate spraying without continual stirring. The particle size is sufficiently large, and the quantity of non-absorbent dust used is sufficiently great that when the mixture is sprayed with fiber glass onto the supporting surface, the fiber glass particles lay down and do not have to be rolled. The quantity of polyester resin used is maintained sufficiently great that a satisfactory bond is created around the fiber glass particles and with the supporting surface on which the mixture is sprayed.

While the use of fillers for various purposes has been known for years, the use of an inert, non-absorbent dust in accordance with this invention yields surprising results. When this method and this mixture of inert, non-absorbent dust and resin is used, the step of rolling the fiber glass and resin mix is eliminated. For some unexplained reason, the fiber glass particles lay down properly when sprayed in conjunction with this mixture. As a consequence of this unexpected result, the costly and time consuming rolling step is completely eliminated.

Surprisingly, the addition of such large quantities of an inert material does not substantially impair the strength of the reinforced layer. Thus, substantial savings in material costs are also effectuated by this invention. Less resin can be utilized without materially decreasing the strength and rigidity of the composite panel. While peel strength between the resin backing layer and, for example, a plastic sheet is undoubtedly reduced somewhat, such reduction is not sufficient that it materially affects the strength of a composite panel for most present day usages of such panels. Since inert, non-absorbent dusts are readily available which are considerably cheaper than polyester resin, substantial savings in material costs are realized.

A second economy is effectuated by the surprising fact that less fiber glass can be used in accordance with this invention. Thus, while present systems require that the fiber glass particles maintain a ratio by weight to the polyester resin in the range of from 1:2, to 1:3, this ratio can be reduced to the range of from about 1:3, to 1:4 when the fiber glass is sprayed in conjunction with a polyester resin mixture including an inert, non-absorbent dust. Apparently, the presence of this dust as discrete particles in the polyester resin mix actually enhances the rigidity of the reinforced layer, thereby allowing one to achieve the same degree of rigidity as was achieved in prior art methods while actually using less fiber glass. Since inert, non-absorbent dusts can be found which are less expensive than fiber glass, this unexpected, bonus advantage results in an additional savings in material costs. The composite panel of this invention is surprisingly strong and rigid, even though less resin and less fiber glass are used in its manufacture. It can be used in almost all building applications.

Furthermore, when this invention is utilized, the necessity of applying resin and fiber glass particles in two separate layers is totally eliminated. The bulk of inert, non-absorbent particles utilized in the mixture greatly reduce shrinkage of the resin, and thereby minimize the chances of warpage of the plastic sheet. Thus, the resin mixture and fiber glass particles can be applied in a single thick layer, rather than two separate thin layers.

Additionally, the probability of melt-through is greatly reduced as a result of this invention. Because the actual quantity of resin being applied to the backing sheet is reduced, the heat of polymerization and the possibility for chemical interaction with the plastic sheet are reduced.

Another important advantage realized is that as a result of this invention, polyester panels can be "sprayed" in place. For example, plywood can be nailed to a roof and then spray coated with a polyester and fibrous glass mix in accordance with this invention. Similarly, a plastic floor for a pool can be sprayed directly onto a flat sandy pool bottom. Thus, the use of polyester and fibrous glass spraying can be greatly increased, beyond merely spraying as backing on plastic facing sheets.

DESCRIPTION OF THE PREFERRED EMBODIMENTS

In accordance with the preferred embodiments of this invention, the polyester resin is first mixed with inert, non-absorbent dust. Since the inert, non-absorbent dust is insoluble, it is stirred into suspension. This mixture then flows through tubing to a spray gun which includes a chopping wheel for chopping a fiber glass strand into small fiber glass particles. As is conventional, a catalyst is also fed to the gun and is mixed with the dust and resin mixture at the gun nozzle. The resin mixture, including the dust, is then sprayed with the fiber glass particles onto the supporting surface, such as a plastic sheet, or plywood, or sand. The fiber glass particles lay down on the supporting surface without the necessity of rolling. The resin is allowed to cure, to thereby form a composite panel of a plastic facing layer and a rigidifying resin, fiber glass, and inert, non-absorbent dust layer.

The dust used in this invention must be substantially non-absorbent. If the dust used is absorbent, it will tend to dry the resin mixture and thereby destroy the effectiveness of adhering resin to the plastic sheet. Further, the necessity of saturating absorbent dust particles with resin would be uneconomical. More resin would be required in order to compensate for such absorbency than is required where the dust is non-absorbent.

Additionally, the dust used must be chemically inert with respect to the polyester resin. If the dust reacts chemically in any substantial way with the polyester resin, it will tend to defeat the purpose of applying polyester resin to the plastic sheet by interferring with the polymerization and bonding process between the resin and the plastic sheet.

Mineral dusts, such as silicates, have been found to be particularly well suited for use in this invention. More particularly, marble dust, talc dust and silica sand all are examples of inert, non-absorbent mineral dust which can be used to practice this invention. Of these, marble dust has been found to work particularly well. For one thing, it works well in connection with the type of hydraulic spray equipment which is commonly used in spraying a polyester resin backing onto a plastic sheet. Secondly, of these three mineral dusts, marble dust gives the most satisfactory results in causing the fiber glass particles to lay down on a plastic sheet without rolling.

The dust particles must be sufficiently small in size that they will remain in suspension without continual stirring. While it is not necessary that a colloidal suspension be formed in the resin, it is important that continual stirring be avoided. This would require additional equipment and would complicate the method. Thus, the particles should be sufficiently small that once stirred, they would remain in suspension for several minutes without restirring. This limitation is somewhat variable in that it is dependent on the thickness of the particular polyester resin used. Thus, larger dust particles can be utilized by adding a thickener to the resin.

The dust particles must also be sufficiently small that they pass through some type of spraying equipment. However, this requirement is somewhat less important than the requirement above since those particles which will form a suitable suspension will generally pass through most types of spraying equipment.

It has been found that the invention will work utilizing dust which will pass through screen in the range of from 40 mesh to 300 mesh. 40 mesh constitutes an upper limitation on particle size since at this size, considerable stirring of the dust in the resin is required in order to maintain a proper suspension. Furthermore, it is necessary to utilize an air spray gun on particles this large, rather than a hydraulic spray gun which is commonly used for this purpose, since an air spray gun does not include valves with narrow openings, e.g. the type which are found in hydraulic spray guns.

At the other extreme, 300 mesh dust is on the verge of being too fine. For some reason, the fiber glass does not lay down quite as well when the dust being used is this fine. Also, the resin mix, with such fine dust included, seems too pasty to handle with the spraying equipment. Finally, when the dust used is this fine, the ratio of resin to dust must be greater than when the dust is somewhat coarser, in order to overcome pastiness.

Performance will be improved by utilizing dust which will pass through screens within the range of from 100 to 250 mesh. Indeed, particle sizes which will pass through screen in the range of about 200 mesh provide the best results.

The polyester compositions are those commonly used to spray with fibrous glass onto acrylic plastic sheet. Polyesters are well-known thermosetting resins derived from the reaction of at least one dihydric alcohol with at least one dicarboxylic acid, or ester forming derivative thereof, wherein at least one carboxylic acid is unsaturated, preferably an alpha, beta-unsaturated. The polyester can include a polymeric chain containing varying proportions of saturated and unsaturated acid moieties. The polyesters are dissolved in a solvent, such as styrene, which is copolymerizable with the polyesters to form a rigid solid mass.

Examples of such dihydric alcohols include: ethylene glycol, propylene glycol, the butylene glycols, diethylene glycol, triethylene glycol, the polyethylene glycols, and unsaturated glycols such as, for example, vinylethylene glycol.

Examples of alpha, beta-unsaturated dicarboxylic acids include; maleic anhydride, maleic acid, fumaric acid, citraconic anhydride, citraconic acid and itaconic acid.

Examples of saturated acids which can be used in accordance with the invention include: phthalic acid, phthalic anhydride, and tetrachlorophthalic anhydride, as well as the straight chain aliphatic dicarboxylic acids such as succinic, adipic, azelaic and sebacic acids.

Ester forming derivatives of dicarboxylic acids include: dicarboxylic acids and the anhydrides, esters and acid halides thereof, all of which are ester forming.

Preferably, the polyester resins are low reactivity, low viscosity and open mold resins. Some suitable formulations are thixotropic to prevent drainage when sprayed onto a vertical surface. They can be either promoted or unpromoted. Such resins are well-known in the art and their use in this application has been widely accepted. Fillers are also frequently used in such resins to effectuate economies, add color, etc. Specifically, it has been found that Koppers 1030-5 (trade designation) or Koppers 1060-5 (trade designation) provide excellent polyester resins for use in this invention. Both are low reactivity, low viscosity, open mold resins. 1030-5 is unpromoted and thixotropic 1060-5 is promoted.

A sufficient quantity of dust must be added to the resin to insure that the fiber glass particles will lay down when sprayed onto the plastic sheet. Too much dust must be avoided since it will tend to foul the spraying operation by making the resin and dust mixture too sticky and by clogging orifices. Furthermore, a sufficient quantity of resin must be included in the mix to insure proper bonding around the fiber glass and to the plastic sheet. About three parts by volume of dust to about seven parts by volume of resin is a lower extreme with respect to this mix ratio. While such a ratio provides acceptable results, the fiber glass particles do not lay down quite as well as when greater quantities of dust are used. On the other hand about three parts by volume of dust to about one part by volume of resin is almost too pasty or too thick to spray properly, although satisfactory results can be achieved at this extreme. Best results are obtained in the parts by volume ratio range of about from 3:5 to 2:1. Indeed, the results achieved at the ratio of approximately one part by volume dust to one part by volume resin are particularly exceptional. At this ratio, there is not so much dust as to make the mix thick or pasty, and yet there is sufficient dust to insure that the fiber glass particles will lay down properly on the plastic sheet.

There is some correlation between the particle size of the dust and the ratio of dust to resin which can be used. Thus, where the dust particles are smaller, more resin must be used in order to prevent the mix from being too pasty. This in turn provides fewer dust particles to insure that the fiber glass particles lay down properly. Thus, it can be seen that the parameters of dust particle size and mix ratios are somewhat interrelated.

It has been unexpectedly found that the quantity of fiber glass particles utilized to lay up a proper backing for plastic sheets can be decreased. Normally, one part by weight of fiber glass particles are sprayed with two or three parts by weight of polyester resin. When the polyester resin is mixed with inert, non-absorbent dust, the ratio of fiber glass to the dust and resin mixture can be decreased to somewhere in the range of about from 1:5, to 1:8. Of course, a fraction of the increase in this ratio is due to the fact that the resin and dust mix is just slightly heavier than an equivalent volume of resin alone. However, this increase is less than 5 percent when the ratio of resin to dust is 1:1 by volume. Apparently the improved ratio is primarily due to the fact that the dust used in the invention itself acts to increase the rigidity of the backing layer for the plastic sheet.

Within the more preferred ranges of operation, it has been found that standard spray equipment utilized in spraying polyester resin and fiber glass backing onto a plastic sheet can be utilized in accordance with this invention. Thus, a hydraulic spray gun, one which does not use air to create a spray, having a chopper wheel associated with its spray head can be used to spray the resin and inert, non-absorbent dust mix. It may be necessary to increase the pressure at the gun, particularly where the ratio of dust to resin is greater.

In the higher limits of particle size, i.e. at 40 mesh particles, it becomes necessary to utilize an air spray gun, rather than the hydraulic spray gun. Air spray guns have no small valves which can be clogged by the larger particles. It may also be necessary to use such air spray guns where the resin and dust mix becomes too pasty.

In accordance with this invention, a filter is placed in the flow line between the resin and dust mix source and the spray gun. This filters out any large chunks which would otherwise most certainly foul the gun. An additional filter is provided at the spray head to further insure that blockage will not result from inadvertently passed larger particles of dust material.

When the mix is sprayed onto an acrylic sheet, the resulting panel has a decorative plastic facing layer and a rigid backing layer. The composition of the backing layer is in accordance with the proportions set forth above. The panel is surprisingly strong and rigid, even though less fiber glass and less resin are used. Also, it can be sprayed onto a plywood sheet, as for example in constructing roofing. Yet another example involves spraying the mix directly onto a flat, sandy surface in making a pool floor. In both of these latter examples, the rigid polyester, fibrous glass and inert, non-absorbent dust layer would be the surface or visible layer. Because the fibrous particles lay down, rolling is unnecessary.

The invention is further illustrated by reference to the following examples. In all of the following examples, the polyester resin utilized was Koppers 1030-5. In all examples, the resin mix is sprayed onto an acrylic facing sheet. The procedures are evaluated in accordance with operational ease, the extent to which they cause the fiber glass particles to lay down on the plastic sheet, the extent to which shrinkage and plastic sheet warpage was eliminated in curing, the extent to which melt-through was eliminated and the suitability of the panel created. In all examples, only one thick layer of resin, dust and fiber glass particles was applied to the plastic sheet. The hydraulic spray gun referred to is of the type conventionally used and includes a conventional chopper wheel. The air spray gun referred to is a conventional air spray gun modified by the addition of a chopper wheel and proper feeder tubes.

EXAMPLE 1

One part by volume of 200 mesh marble dust was mixed with one part by volume of polyester resin. Eight parts by weight of this mix were delivered in a hydraulic spray gun with one part by weight of chopped fiber glass particles. Only an initial stirring of the dust and resin mix was necessary throughout the spraying operation. The results were exceptional, with the fibrous glass particles laying down without rolling. When the resin cured, the panel was strong and rigid. No warpage or melt-through occurred.

EXAMPLE 2

Three parts by volume of 200 mesh marble dust were mixed with five parts by volume resin. Five parts by weight of this mixture were sprayed in a hydraulic spray gun with one part by weight of chopped fiber glass. The results were good, except that slightly more fiber glass was required since the resin and dust mixture included less dust than in Example 1.

EXAMPLE 3

Five parts by volume of 200 mesh marble dust were mixed with two parts by volume polyester resin. Eight parts by weight of this mixture were sprayed in a hydraulic spray gun with one part by weight of chopped fiber glass. The results were good, with the fibrous particles laying down without rolling. The results were not optimum, since the mix was slightly pasty.

EXAMPLE 4

One part by volume of 40 mesh silica sand was mixed with one part by volume of polyester resin. Six parts by weight of this mixture were sprayed by an air spray gun with one part by weight of chopped fiber glass. The fibrous glass particles laid down nicely and the resultant panel was strong and rigid. However, fairly frequent stirring of the sand in the resin was required.

EXAMPLE 5

Two parts by volume 40 mesh silica sand were mixed with one part by volume polyester resin. Eight parts by weight of this mixture were sprayed in an air spray gun with one part by weight of chopped fiber glass. The results obtained were good, but as in Example 4, frequent stirring of the sand and the resin mixture was required.

EXAMPLE 6

Three parts by volume of 40 mesh silica sand were mixed with one part by volume of polyester resin. Eight parts by weight of this mixture were sprayed in an air spray gun with one part by weight of chopped fiber glass. The results were comparable to those achieved in examples 4 and 5 above.

EXAMPLE 7

Three parts by volume of 300 mesh talc were mixed with seven parts by volume polyester resin. Five parts by weight of this mixture were sprayed in a hydraulic spray gun with one part by weight of chopped fiber glass. The results were acceptable, but the mixture was too pasty and thick for optimum usage. Further, the glass did not lay down quite as well in this example as it did in the examples discussed above.

It will be understood that the above are preferred embodiments of this invention and that many alterations and modifications can be made thereof without departing from the spirit and broader aspects of the invention.

The embodiments of the invention in which an exclusive property or privilege is claimed are defined as follows.

1. A method for applying a fiber glass and polyester resin solution mixture in a layer onto a supporting surface, said method comprising: mixing an inert, non-absorbent dust, having particle sizes which will pass through screen in the range of about from 40 to 300 mesh with a sprayable polyester resin solution in a proportion by volume of said dust to said resin solution in the range of about from 3:7 to 3:1; spraying the mixture of said dust and resin solution onto the supporting surface with particles of fiber glass in the ratio of about three to eight parts by weight of said mixture of dust and resin solution with about one part by weight of fiber glass particles.

2. The method of claim 1 in which the resin solution and dust mixture is filtered prior to being sprayed with said fiber glass.

3. The method of claim 1 in which the inert, non-absorbent dust used has a screen size in the range of about from 100 to 250 mesh and in which the ratio by volume of said dust to said resin solution is maintained at approximately 1:1.

4. The method of claim 1 in which said ratio of dust to resin solution is in the range of from about 1:2 to 2:1.

5. The method of claim 3 in which said inert, non-absorbent dust is a mineral dust.

6. The method of claim 3 in which said inert, non-absorbent dust is one of the group consisting of marble dust, talc dust and silica sand.

7. The method of claim 3 in which said dust is marble dust which will pass through screen of approximately 200 mesh.

8. The method of claim 1 in which said inert, non-absorbent dust is a mineral dust.

9. The method of claim 1 in which said inert, non-absorbent dust is one of the group consisting of marble dust, talc dust and silica sand.

* * * * *